(12) United States Patent
Yakali (10) Patent No.: US 9,329,048 B2
(45) Date of Patent: May 3, 2016

(54) NAVIGATION DEVICE AND METHOD PROVIDING A LOGGING FUNCTION

(75) Inventor: Hakan Yakali, Amstelveen (NL)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 13/616,566

(22) Filed: Sep. 14, 2012

(65) Prior Publication Data

US 2013/0013192 A1   Jan. 10, 2013

Related U.S. Application Data

(63) Continuation of application No. 12/007,140, filed on Jan. 7, 2008, now abandoned.

(51) Int. Cl.

| | |
|---|---|
| *G01C 21/14* | (2006.01) |
| *G01C 21/34* | (2006.01) |
| *G07C 5/02* | (2006.01) |
| *G01C 21/26* | (2006.01) |
| *G07C 5/00* | (2006.01) |
| *G07C 5/08* | (2006.01) |
| *G08G 1/00* | (2006.01) |

(Continued)

(52) U.S. Cl.
CPC ............ *G01C 21/3407* (2013.01); *G01C 21/26* (2013.01); *G07C 5/008* (2013.01); *G07C 5/02* (2013.01); *G07C 5/08* (2013.01); *G07C 5/085* (2013.01); *G08G 1/20* (2013.01); *G01S 5/0027* (2013.01); *H04W 4/02* (2013.01)

(58) Field of Classification Search
CPC .... G06F 3/04842; G06F 3/048; B60W 40/09; B60L 2240/622; G01C 21/3407; G01C 21/26; G07C 5/02; G07C 5/08; G07C 5/008; G07C 5/085; G08G 1/20; H04W 4/02; G01S 5/0027
USPC .......... 369/21; 701/32.4, 33.4, 454, 461, 466, 701/521, 400, 408, 409, 424, 425, 430, 467, 701/468, 483, 519
See application file for complete search history.

(56) References Cited

U.S. PATENT DOCUMENTS

| | | | | |
|---|---|---|---|---|
| 5,611,044 | A | * | 3/1997 | Lundeby ................... 714/38.11 |
| 6,034,626 | A | | 3/2000 | Maekawa et al. |
| 6,064,322 | A | * | 5/2000 | Ohira ....................... 340/995.18 |

(Continued)

FOREIGN PATENT DOCUMENTS

| | | |
|---|---|---|
| JP | 2005100382 A | 4/2005 |
| TW | 200716949 A | 5/2007 |

(Continued)

OTHER PUBLICATIONS

International Search report issued Oct. 15, 2008 for International Application No. PCT/EP2007/011239.

*Primary Examiner* — Thomas G Black
*Assistant Examiner* — Sze-Hon Kong (57) ABSTRACT

A method of providing a logging function in a portable navigation device and a portable device adapted to provide such a function are described. The method includes the step of storing location information relating to current position and time-specific information relating to a current position in a non-volatile memory of the device to create a log. The storage of such information only occurs when one of a specified set of events occurs, the set of events being specific to either a navigation mode or a free-driving mode of operation of the device.

16 Claims, 8 Drawing Sheets

(51) Int. Cl.
*H04W 4/02* (2009.01)
*G01S 5/00* (2006.01)

(56) References Cited

U.S. PATENT DOCUMENTS

| | | | |
|---|---|---|---|
| 6,064,941 A * | 5/2000 | Nimura et al. | 701/416 |
| 6,084,542 A * | 7/2000 | Wright et al. | 342/357.75 |
| 6,115,655 A * | 9/2000 | Keith et al. | 701/467 |
| 6,211,798 B1 * | 4/2001 | Albrecht et al. | 340/990 |
| 6,266,614 B1 * | 7/2001 | Alumbaugh | 701/468 |
| 6,278,938 B1 * | 8/2001 | Alumbaugh | 701/438 |
| 6,301,533 B1 * | 10/2001 | Markow | 701/32.4 |
| 6,314,369 B1 | 11/2001 | Ito et al. | |
| 6,356,837 B1 * | 3/2002 | Yokota et al. | 701/411 |
| 6,393,346 B1 * | 5/2002 | Keith et al. | 701/521 |
| 6,456,932 B2 * | 9/2002 | Yagyu | 701/425 |
| 6,459,987 B1 | 10/2002 | Krull et al. | |
| 6,542,814 B2 * | 4/2003 | Polidi et al. | 701/454 |
| 6,622,083 B1 | 9/2003 | Knockeart et al. | |
| 6,760,662 B2 * | 7/2004 | Lee | 701/431 |
| 6,778,903 B2 * | 8/2004 | Robinson et al. | 701/428 |
| 6,826,473 B1 | 11/2004 | Burch et al. | |
| 6,845,318 B1 * | 1/2005 | Moore et al. | 701/454 |
| 6,847,891 B2 | 1/2005 | Pietras et al. | |
| 6,853,917 B2 * | 2/2005 | Miwa | 701/467 |
| 6,975,929 B2 * | 12/2005 | Maruyama | 701/521 |
| 7,003,397 B2 * | 2/2006 | Yokota et al. | 701/454 |
| 7,020,546 B2 * | 3/2006 | Nagai et al. | 701/33.4 |
| 7,058,506 B2 * | 6/2006 | Kawase et al. | 701/410 |
| 7,117,075 B1 | 10/2006 | Larschan et al. | |
| 7,177,738 B2 * | 2/2007 | Diaz | 701/29.3 |
| 7,197,395 B2 * | 3/2007 | Kishigami | 701/428 |
| 7,197,500 B1 * | 3/2007 | Israni et al. | 707/809 |
| 7,215,255 B2 * | 5/2007 | Grush | G06Q 30/0284 340/932.2 |
| 7,272,497 B2 * | 9/2007 | Koshiji et al. | 701/455 |
| 7,292,936 B2 * | 11/2007 | Furukawa | 701/455 |
| 7,312,749 B2 * | 12/2007 | Yeh | 342/357.52 |
| 7,349,800 B2 * | 3/2008 | Forlenza et al. | 701/411 |
| 7,379,812 B2 * | 5/2008 | Yoshioka et al. | 701/426 |
| 7,472,019 B2 * | 12/2008 | Hara | 701/426 |
| 7,522,069 B2 * | 4/2009 | Tunnell et al. | 340/995.19 |
| 7,542,831 B2 * | 6/2009 | Christie et al. | 701/19 |
| 7,606,657 B2 * | 10/2009 | Hessling et al. | 701/454 |
| 7,680,595 B2 * | 3/2010 | Brinton et al. | 701/527 |
| 7,702,456 B2 * | 4/2010 | Singh | 701/425 |
| 7,835,859 B2 * | 11/2010 | Bill | 701/424 |
| 7,848,905 B2 | 12/2010 | Troxler et al. | |
| 7,978,076 B2 * | 7/2011 | Fast et al. | 340/572.1 |
| 8,009,037 B2 * | 8/2011 | Staton et al. | 340/539.13 |
| 8,019,535 B2 * | 9/2011 | Endo et al. | 701/450 |
| 8,024,114 B2 * | 9/2011 | Doyle | 701/417 |
| 8,032,276 B2 * | 10/2011 | Cawse | 701/32.4 |
| 8,285,424 B2 * | 10/2012 | Nakajima et al. | 701/1 |
| 8,392,552 B2 * | 3/2013 | Alexander et al. | 709/224 |
| 8,467,961 B2 * | 6/2013 | Obradovich et al. | 701/425 |
| 2001/0044697 A1 * | 11/2001 | Kageyama | 701/301 |
| 2002/0029109 A1 * | 3/2002 | Wong et al. | 701/213 |
| 2002/0040271 A1 * | 4/2002 | Park et al. | 701/209 |
| 2002/0154035 A1 * | 10/2002 | Flick | 340/988 |
| 2002/0156576 A1 * | 10/2002 | Annett et al. | 701/213 |
| 2003/0018428 A1 * | 1/2003 | Knockeart et al. | 701/210 |
| 2003/0109266 A1 | 6/2003 | Rafiah et al. | |
| 2003/0135304 A1 | 7/2003 | Sroub et al. | |
| 2004/0024525 A1 | 2/2004 | Maruyama | |
| 2004/0054444 A1 | 3/2004 | Abeska et al. | |
| 2004/0204846 A1 * | 10/2004 | Yano et al. | 701/210 |
| 2004/0220707 A1 * | 11/2004 | Pallister | 701/24 |
| 2004/0220729 A1 | 11/2004 | Park et al. | |
| 2005/0038595 A1 | 2/2005 | Yokota et al. | |
| 2005/0065713 A1 * | 3/2005 | Yamada et al. | 701/200 |
| 2005/0071078 A1 | 3/2005 | Yamada et al. | |
| 2005/0190468 A1 * | 9/2005 | Noguchi | 360/1 |
| 2005/0206534 A1 | 9/2005 | Yamane et al. | |
| 2006/0099959 A1 * | 5/2006 | Staton et al. | 455/456.1 |
| 2006/0100778 A1 | 5/2006 | Lee et al. | |
| 2006/0149459 A1 | 7/2006 | Matsuura et al. | |
| 2006/0200286 A1 * | 9/2006 | Kumagai et al. | 701/35 |
| 2006/0265124 A1 | 11/2006 | Ohler | |
| 2007/0005231 A1 * | 1/2007 | Seguchi | 701/117 |
| 2007/0005235 A1 * | 1/2007 | Suzuki et al. | 701/200 |
| 2007/0027583 A1 * | 2/2007 | Tamir et al. | 701/1 |
| 2007/0050108 A1 | 3/2007 | Larschan et al. | |
| 2007/0078729 A1 * | 4/2007 | Brown | 705/26 |
| 2007/0088502 A1 * | 4/2007 | Oumi et al. | 701/211 |
| 2007/0150137 A1 | 6/2007 | Graham | |
| 2007/0179709 A1 * | 8/2007 | Doyle | 701/209 |
| 2007/0250258 A1 | 10/2007 | Hager | |
| 2007/0293971 A1 | 12/2007 | Ogle et al. | |
| 2008/0030376 A1 * | 2/2008 | Tunnell et al. | 340/988 |
| 2008/0088438 A1 | 4/2008 | Aninye et al. | |
| 2008/0097691 A1 * | 4/2008 | Seifried | 701/209 |
| 2008/0125959 A1 * | 5/2008 | Doherty et al. | 701/200 |
| 2008/0125965 A1 * | 5/2008 | Carani et al. | 701/207 |
| 2008/0147305 A1 * | 6/2008 | Kawamata et al. | 701/117 |
| 2008/0215415 A1 * | 9/2008 | Willms | 705/10 |
| 2008/0294337 A1 * | 11/2008 | Dawson et al. | 701/209 |
| 2008/0318616 A1 | 12/2008 | Chipalkatti et al. | |
| 2008/0319645 A1 | 12/2008 | Kumagai et al. | |
| 2009/0005978 A1 | 1/2009 | Forstall et al. | |
| 2009/0143079 A1 | 6/2009 | Klassen et al. | |
| 2009/0177378 A1 * | 7/2009 | Kamalski et al. | 701/207 |
| 2010/0063904 A1 * | 3/2010 | Ronen et al. | 705/30 |
| 2011/0106436 A1 * | 5/2011 | Bill | 701/206 |
| 2011/0270654 A1 | 11/2011 | Banerjee et al. | |
| 2012/0010810 A1 * | 1/2012 | Cawse | 701/468 |
| 2012/0101717 A1 * | 4/2012 | Zhang | 701/409 |
| 2012/0277950 A1 * | 11/2012 | Plante et al. | 701/31.5 |
| 2013/0060465 A1 * | 3/2013 | Smartt | 701/461 |

FOREIGN PATENT DOCUMENTS

| | | |
|---|---|---|
| TW | M320678 U | 10/2007 |
| WO | 0169176 A | 9/2001 |
| WO | 2004054444 A1 | 7/2004 |

* cited by examiner

NAVIGATION DEVICE AND METHOD PROVIDING A LOGGING FUNCTION

The present application is a continuation of U.S. patent application Ser. No. 12/007,140, filed on Jan. 7, 2008 now abandoned, the disclosure of which is hereby incorporated by reference in its entirety.

BACKGROUND OF THE INVENTION

Portable navigation devices (PNDs) including GPS (Global Positioning System) signal reception and processing means are well known and are widely employed as in-car navigation systems. In essence, modern PNDs comprise:
 a processor,
 memory (both volatile and non-volatile),
 map data stored within said memory,
 a software operating system and one or more additional programs executing thereon to control the functionality of the device and provide various features,
 a GPS antenna by which satellite-broadcast signals including location data can be received and subsequently processed to determine a current location of the device,
 input and output means, examples including a visual display (which may be touch sensitive to allow for user input), one or more physical buttons to control on/off operation or other features of the device, a speaker for audible output,
 one or more physical connectors by means of which power and optionally one or more data signals can be transmitted to and received from the device, and
 optionally one or more wireless transmitters/receivers to allow communication over mobile telecommunications and other signal and data networks, for example Wi-Fi, Wi-Max GSM and the like.

The utility of the PND is manifested primarily in its ability to determine a route between start or current location and a destination, which can be input by a user of the computing device, by any of a wide variety of different methods, for example by postcode, street name and number, and previously stored well known, favourite or recently visited destinations. Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing and predicted traffic and road conditions, historical information about road speeds, and the driver's own preferences for the factors determining road choice. In addition, the device may continually monitor road and traffic conditions, and offer to or choose to change the route over which the remainder of the journey is to be made due to changed conditions. Real time traffic monitoring systems, based on various technologies (e.g. mobile phone calls, fixed cameras, GPS fleet tracking) are being used to identify traffic delays and to feed the information into notification systems.

The navigation device may typically be mounted on the dashboard of a vehicle, but may also be formed as part of an on-board computer of the vehicle or car radio. The navigation device may also be (part of) a hand-held system, such as a PDA (Personal Navigation Device) a media player, a mobile phone or the like, and in these cases, the normal functionality of the hand-held system is extended by means of the installation of software on the device to perform both route calculation and guidance along a calculated route. In any event, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function provided, and the navigation along such a route is another primary7 function. During navigation along a calculated route, the PND provides visual and/or audible instructions to guide the user along a chosen route to the end of that route, that is the desired destination. It is usual for PNDs to display map information on-screen during the navigation, such information regularly being updated on-screen so that the map information displayed is pertinent to the current location of the device, and thus of the user or user's vehicle if the device is being used for in-car navigation. An icon displayed on-screen typically denotes the current device location, and is centred with the map information of current and surrounding roads and other map features being also displayed. Additionally, navigation information may be displayed, optionally in a status bar above, below or to one side of the displayed map information, examples of navigation information including the distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that
 a user deviates from the previously calculated route during navigation therealong,
 real-time traffic conditions dictate that an alternative route would be more expedient and the device is suitably enabled to recognize such conditions automatically, or
 if a user actively causes the device to perform route re-calculation for any reason.

It is also known to allow a route to be calculated with user defined criteria; for example, the user may prefer a scenic route to be calculated by the device. The device software would then calculate various routes and weigh more favourably those that include along their route the highest number of points of interest (known as POIs) tagged as being for example of scenic beauty. Other POI-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel.

As mentioned, PNDs may be used in a personal or business capacity, the latter use being more appropriate for commercial driving activities, such as courier and other delivery services. Additionally, where a PND is used in a car used in both a personal and business capacity, the user will typically be required, by the national government or other national authority, to keep a record of all business-only mileage for tax purposes. Additionally, for company-owned vehicles driven by one or many different company employees, the keeping of mileage records and the general use of the vehicle are important in terms of determining the overall costs and benefits provided by the vehicle to the business, and to determine the proper use thereof.

The logging of vehicle use, mileage and location information is known, and indeed well practiced commercially by companies such as Tripmaster Corp., a company which specializes in the installation of dedicated apparatus within the vehicle which communicates with other vehicle systems such as the engine and electronic vehicle management system and performs detailed logging of various engine and other vehicle use parameters. The apparatus interfaces with an on-board computer having GPS functionality to identify the exact travel of the vehicle, the various stops made and their duration, and the manner in which the vehicle made that and any journey. The apparatus requires professional installation within the vehicle in such a manner that it cannot be removed or disconnected and furthermore, the apparatus installed is highly specified in terms of memory, storage and processing capability. This therefore represents a very costly and complex solution to an intrinsically simple problem.

Additionally, U.S. Pat. No. 7,117,075 in the name of Report on Board LLC describes a method for logging and reporting driver activity and vehicle operation includes identifying a driver of a vehicle, recording operating data with an on-board recorder that is hard-wired to an engine control module, coupled to a mileage sensing system, and linked to a global navigation satellite system, and recording duty status of the driver. An hours of service log and a fuel tax log are created from the operating data. The method includes comparing the driver's hours of service log to an applicable requirement, indicating to the driver whether the driver is in-compliance or out-of-compliance with the applicable requirement, automatically uploading the logs to a receiver external to the vehicle using a wireless telecommunications network, and emitting a compliance signal representative of whether the driver is in-compliance or out-of-compliance with the applicable requirement to a second receiver external to the vehicle and under control of authorities. Again, this is a complex and costly solution.

In the case of PNDs, the storage and processing power are limited as the device size and weight are very important factors in the overall utility, portability and desirability thereof. Accordingly, the logging of large amounts of position and time data, for example by logging position and time data repeatedly and periodically every few seconds, is not practical or indeed possible, nor is the processing or formatting of such data in a useful manner.

It is an object of this invention to provide a useful logging and tracking function for PNDs, to provide a logging strategy for PNDs, and to provide a PND so enabled.

BRIEF SUMMARY OF THE INVENTION

According to the present invention there is provided a method of providing a logging function in a PND comprising the steps of Storing information relating to current position and time-specific information relating to said current position in a non-volatile memory of the device to create a log, Characterized in that The storage of such information only occurs when one of a specified set of events occurs, said set of events being specific to either a navigation mode or a free-driving mode of operation of the device, the set of events particular to a navigation mode being one or more of: user-specification of an activity, calculation of a new route, recalculation of a new route subsequent to a deviation from a previous route, reaching a destination; and the set of events particular to a free driving mode being one or more of: user-specification of an activity, powering the device on and/or off, deviation of the device from the current direction and/or road along which the device is traveling.

Preferably, the method includes determining whether a logging function is enabled on the PND, and performing the logging function only if such a function is enabled.

Most preferably, in a navigation mode of operation of the device, the set of events which trigger a logging of information includes the powering on or off of the device.

Further preferably, in a free-driving mode, the event of a deviation triggers the logging of information when the device recognizes a change in the road identification, as represented in the map data by reference to which current device location is identified to the user.

Preferably the method further includes determining whether the device is operating in a business or personal capacity, and logging information in a manner categorized according to one or other of these operative uses.

Most preferably, the method further includes compressing a free-driving mode information log consisting of a plurality of event information, said compression involving the calculation of a notional route between the initial location at which the logging of information began and one or more different locations later in time in the log, and iterating through event information contained in the log between the times of the initial location and the different later location, assessing at each iteration whether an event represents a deviation from the notional route, and if so, performing a re-calculation of said notional route between the location at which the deviation occurred and re-iterating through event information contained in the log subsequent to the time that the event representing the deviation was logged.

In an alternative aspect, the invention also provides a computer program comprising computer program code means adapted to perform all the steps of any methods described above when run on a computer.

In a further aspect, the invention provides a computer program as described above when embodied on or in a computer readable medium.

In a yet further aspect of the invention, there is provided a PND or navigation system comprising at least a processor, memory, and visual display output means adapted to implement the methods as described above.

BRIEF DESCRIPTION OF THE SEVERAL VIEWS OF THE INVENTION

The present application will be described in more detail below by using example embodiments, which will be explained with the aid of the drawings, in which.

DETAILED DESCRIPTION OF THE INVENTION

Figure 1:
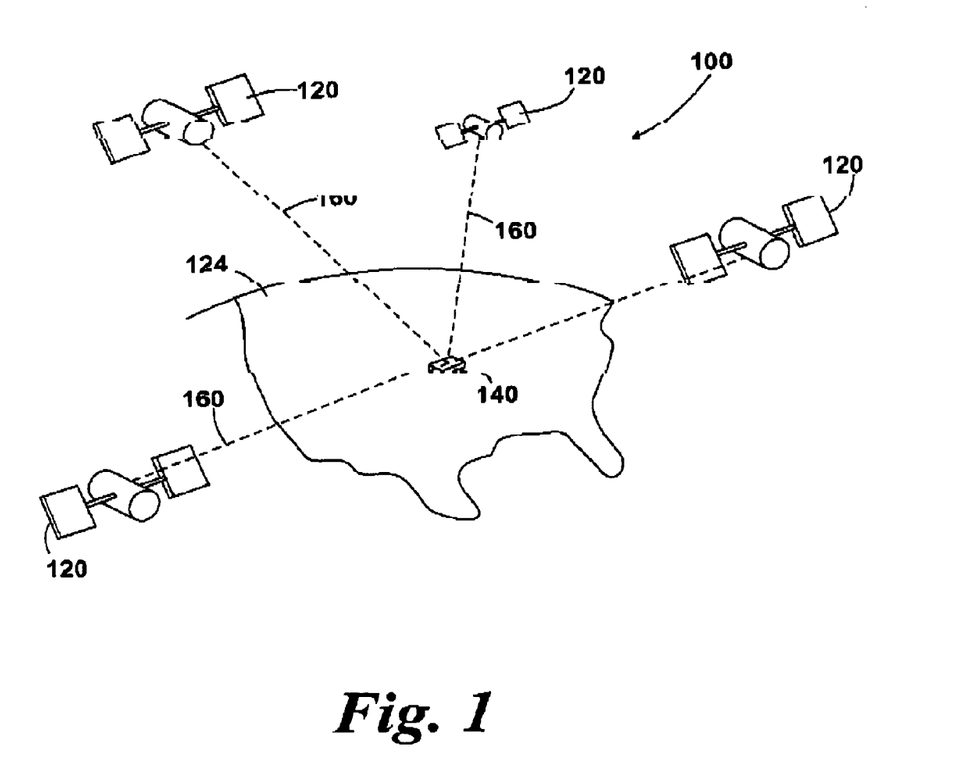
FIG. 1 illustrates an example view of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

Figure 2:
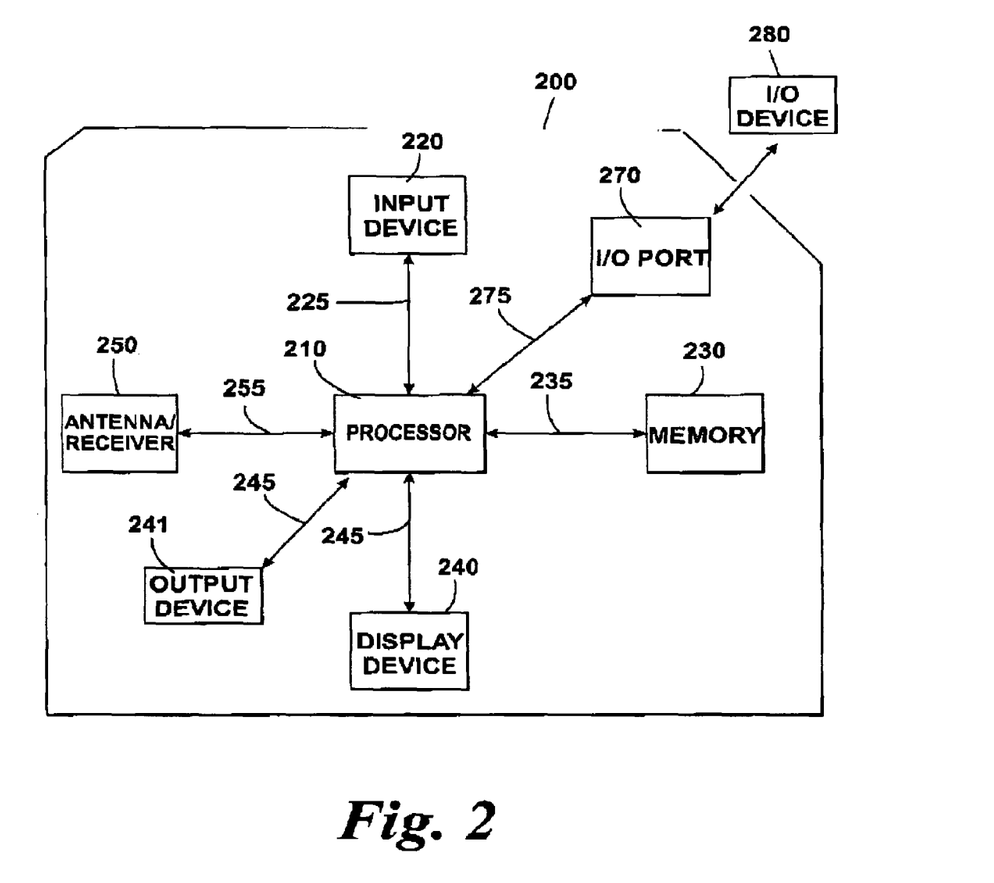
FIG. 2 illustrates an example block diagram of electronic components of a navigation device.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner. FIG. 2 illustrates an example block diagram of electronic components of a navigation device 200, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. The input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 241 can produce audible information to a user of the navigation device 200, it is equally understood that input device 240 can also include a microphone and software for receiving input voice commands as well. In the navigation device 200, processor 210 is operatively connected to and set to receive input information from input device 240 via a connection 225, and operatively connected to at least one of display screen 240 and output device 241, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200 may establish a "mobile" or telecommunications network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
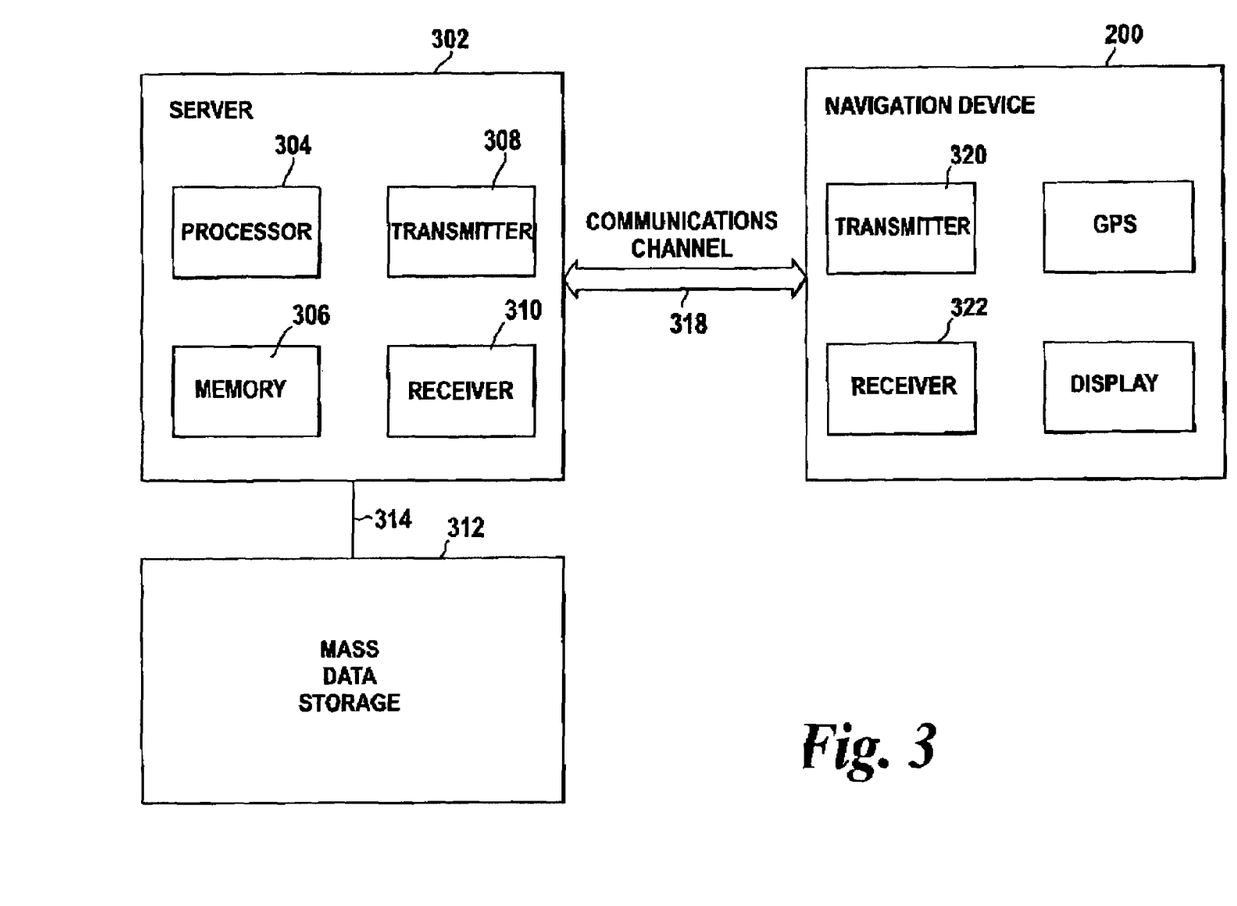
FIG. 3 illustrates an example block diagram of the manner in which a navigation device may receive information over a wireless communication channel.

FIG. 3 illustrates an example block diagram of a server 302 and a navigation device 200 capable of communicating via a generic communications channel 318. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver. Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, the communication channel 318 can include intermediate devices such as routers, repeaters, buffers, transmitters, and receivers, for example.

For example, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
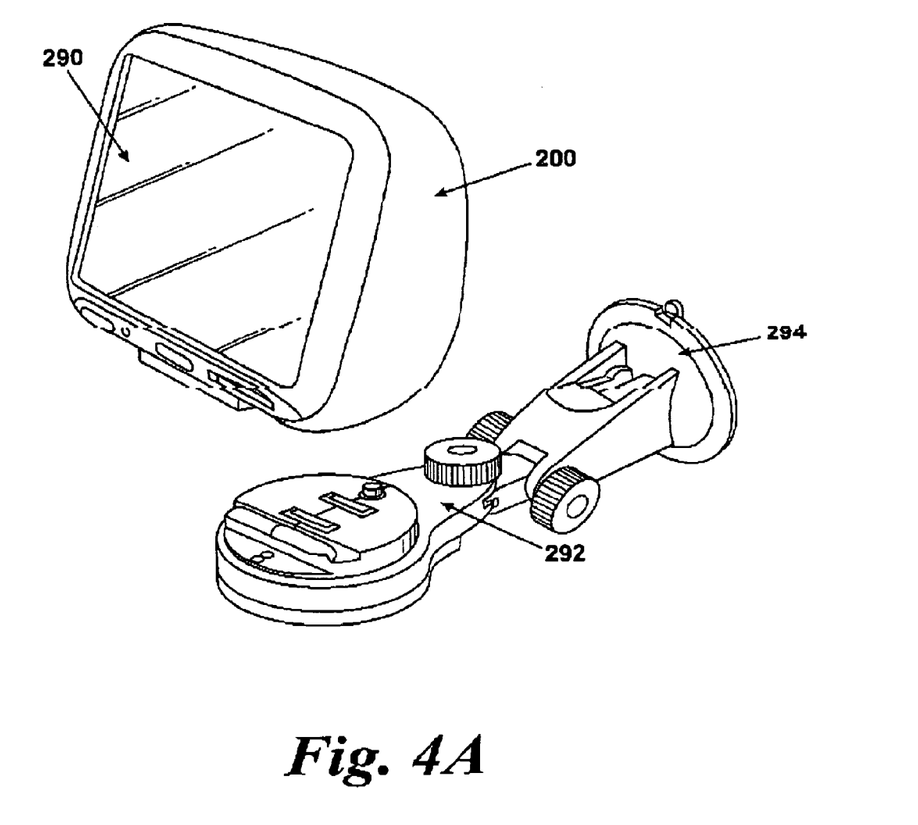
FIGS. 4A and 4B are perspective views of an implementation of an embodiment of the navigation device.
Figure 4B:
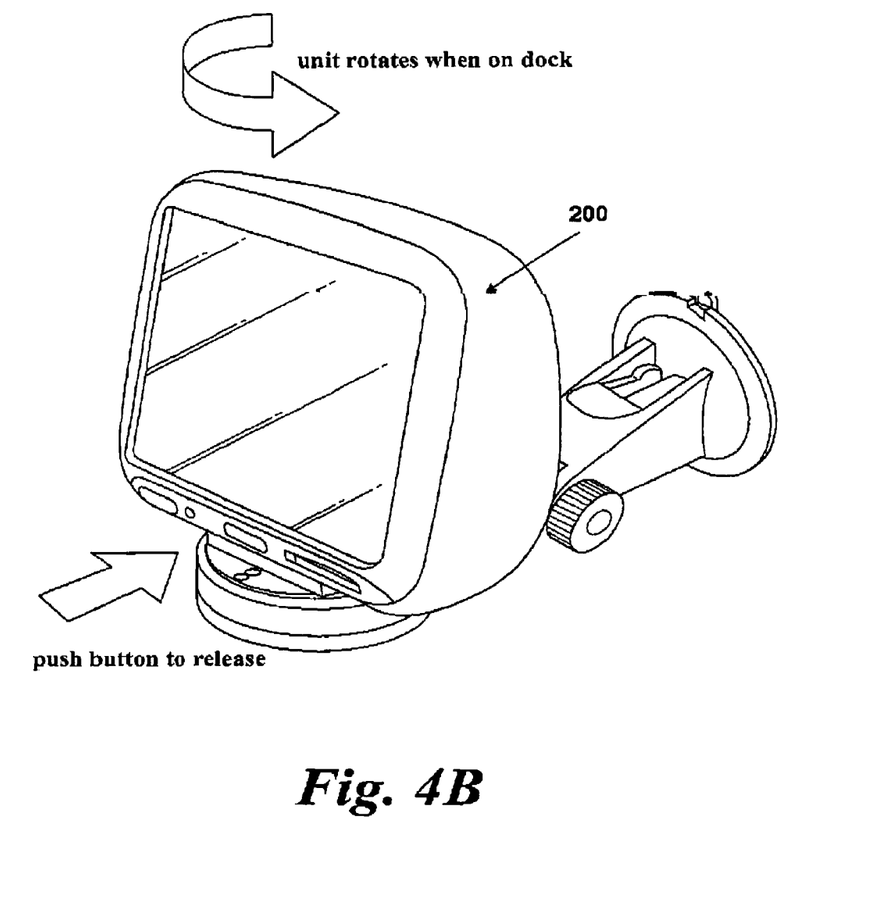

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked. As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

Figure 5:
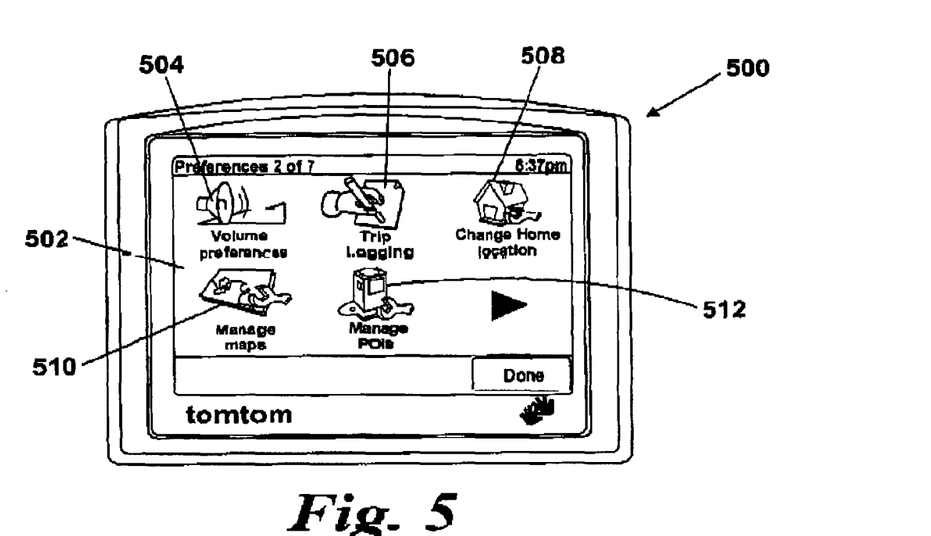
FIGS. 5-9 show screenshots from a PND indicating how the present invention may be put into effect through a software-generated user interface.
Figure 6:
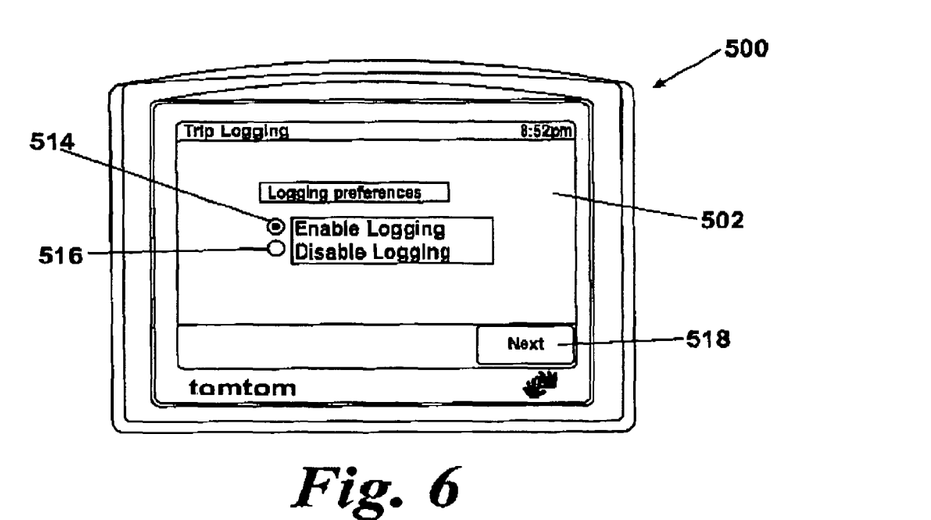
Figure 7:
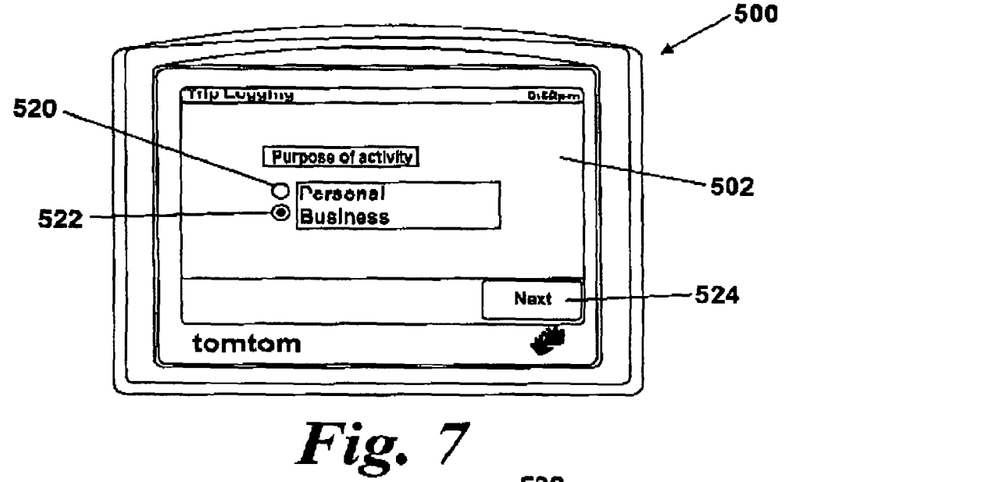

Referring now to FIG. 5, there is shown a PND 500 having a touch sensitive display 502 on which a number of icons 504, 506, 508, 510, 512 are graphically displayed, each icon being representative of a type of preference which when selected facilitates changing the manner of operation of the device. Icon 504 is identified as relating to "Trip Logging" and the selection of this icon results in the display of a two simple selectable options 514, 516, as shown in FIG. 6, the first of these 514 being already shown as selected, such selection being indicative of the current state of the Trip Logging option, that is "enabled". Once a user has enabled the Trip Logging option by touching the display 502 in the region where the "Enable Logging" text appears, or establishes that the Trip Logging option is already enabled and touches the "Next" graphic 518, a further option screen appears as shown in FIG. 7 on which the selection of the purpose of travel activity is made. On this screen, two options 520, 522 are shown, the first being identified as "Personal" and the latter being identified as "Business" and shown as being enabled.

Figure 8:
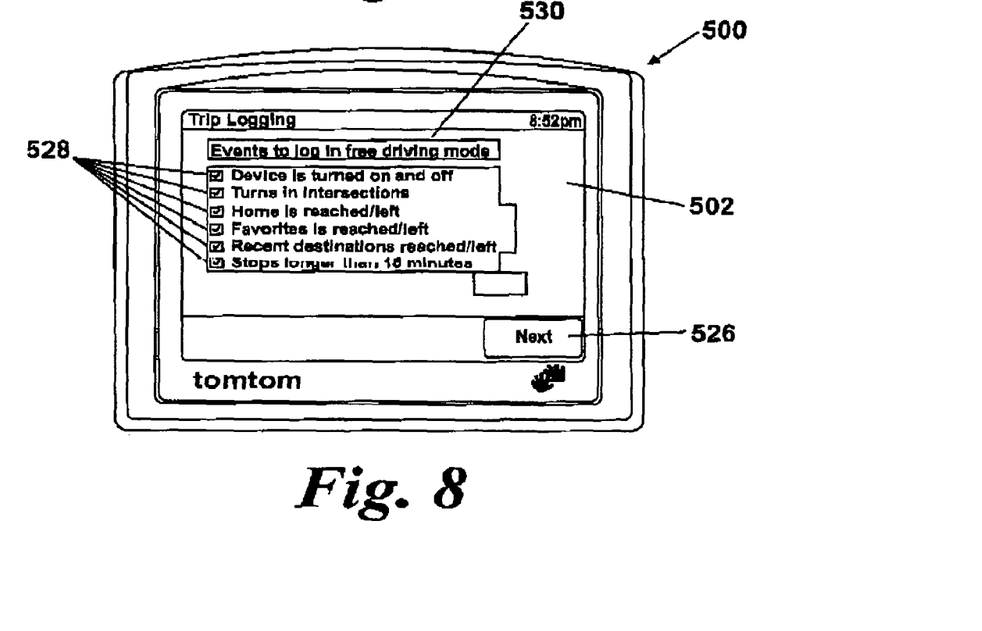
Figure 10:
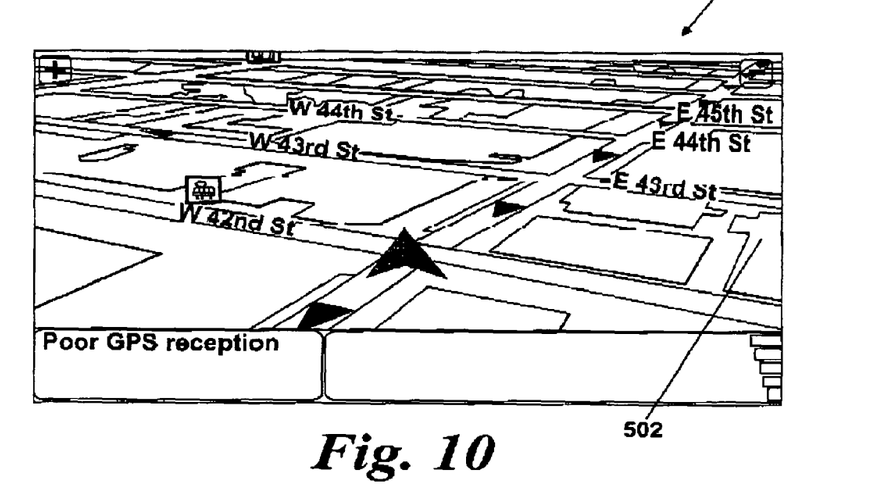
FIG. 10 shows a screenshot from a PND in a free-driving mode.

The display in FIG. 7 also shows a further "Next" graphic 524 which when selected leads to a further option screen shown in FIG. 8, including a further "Next" graphic 526. Various options 528 are listed on the display, each option forming a set of options which are specific to a particular mode of operation of the device, indicated by the displayed text at 530. In this embodiment, the list of options includes the various events which will occur in the device during operation thereof in a "free driving" mode in which no route calculation, or navigation along such route, is being performed. In such a mode, the device merely displays map information, continuously updated according to the movement of the device along particular roads, highways, and thoroughfares, any and all of which have some identifying description included within the map data stored within the memory of the device. A sample screenshot of a device operating in such a mode is provided in FIG. 10.

Figure 9:
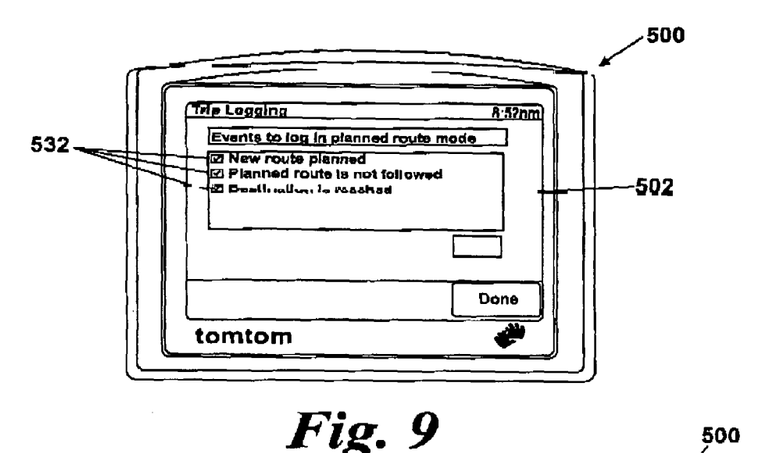

As can be seen from FIG. 8, various event options are listed, these being, in order from top to bottom, "Device is turned on and off", "Turns in intersections", "Home is reached/left", "Favourites is reached/left", "Recent Destinations is reached/left", "Stops longer than 15 minutes". More or less options may form the set of options relevant to the free driving mode, and any one or more of such options may form the set of options relevant to the free driving mode, and are considered to be claimable aspects of this invention. All the options displayed in FIG. 8 are shown selected, and if this is acceptable to the user, selection of the "next" graphic 526 causes the display of a further option list relevant to logging of information in a navigation mode, as represented in FIG. 9. Again, a list of options 532 is displayed which are events upon occurrence of which the logging of information is effected. In the Figure, all the options shown are selected, and in order are "New route planned", "Planned Route not followed", and "Destination reached". An additional possible event not shown in the figure is "Re-calculation of route", but of course this may be encompassed in the "New route planned" option.

Further description is now provided of the mechanism by which the invention may be implemented.

This invention allows for the creation of a virtual logbook of travelled (planned or unplanned) routes categorized according to a particular use, e.g. personal, business, pleasure, emergency, and the like. The virtual log includes accumulated travelled distances using predefined set of events, to be reviewed later for a specific activity.

The invention involves the implementation of an event-based logging strategy. In this approach, the position and the time is logged only when an event is raised. Events can be defined as a state change of a setting within the PND, and also of both spatial and temporal domains.

Possible examples of events include:

deviation from a previously planned route, any user-actuated or automatic route re-calculation every turn or route change made at any route intersection turning the device on and off changing the activity from personal to business and back leaving or arriving home location powering the device on and off leaving or arriving at a favorite location leaving or arriving a recent destination stored in a memory the device being stationary for more than a predetermined amount of time For the sake of simplicity, it is useful to distinguish two modes of travel:

In a free driving mode the navigation device is used passively to see the current location on the map.

In planned route mode, the target destination is entered in to the navigation device by the user, route calculation is performed by the device, optionally a selection of one of a list of possible calculated routes is made by the user, and the device begins navigation of the or the selected route.

As mentioned above, the user can change the setting of the device to "enable logging in free driving" mode on. In this setting, the device will start logging as soon as it is turned on. In "planned route," every new route planning and reaching a destination are also considered as valid events.

A suitable set of events to achieve logging for each travel mode is now described. In this case it is assumed that the PND is being used passively, that is in a free-driving mode, and only the current location is displayed on the on-screen display of map information. Ideally, a device preferences is that as soon as the PND is switched on, the "log information in free driving" mode is enabled. In such setting, the device will log the location and the time at the following preferred events:

When the device is turned on and off,

When an activity (business or personal) is specified,

When home or one of the recorded locations (like recent destinations or favourites) are reached.

When a driven route deviates from the "straight line", that is the current road, at any road intersection.

For example, if N is an initial location of the vehicle (as well as the device in it) and the T is a target destination, travel between N and T will usually involve one or more turns at various road intersections, say at O, P, Q, R and S before reaching the target location T. The user turns the device on; with "logging in free driving mode" enabled. He specifies the purpose of travel whether it is business or personal, and then starts to drive. After reaching the target destination T, the user sets the activity to personal use and turns the device off.

The log for all the events as described above, at the end of this trip, we will have the following trip log entry in trip log file:

Entering Free Driving Mode—[Date/Time].

Device turned on at location N (Total: 400 km)—[date/time or increment a]

Activity set to Business use: Total: 5000 km—[date/time or increment b]

Left turn at O (N-O:5 km, Total:5005 km)—[date/time or increment c]

Right turn at P (O-P:10 km, Total:5015 km)—[date/time or increment d]

Left turn at Q (P-Q:5 km, Total:5020 km)—[date/time or increment e]

Right turn at R (Q-R:10 km, Total:5030 km)—[date/time or increment f]

Left turn at S (R-S:5 km, Total:5035 km)—[date/time or increment g]

Home is reached (S-Home:5 km, Total:5040 km)—[date/time or increment h]

Activity set to Personal use: Total: 400 km—[date/time or increment i]

Device turned off at location T (Total: 400 km)—[date/time or increment j]

Since, in free driving mode, there is no prior route planned, the log will naturally be larger. However, the user may request from device to compress this log to planned route log format which may be much smaller. Such compression is based on an algorithm which effectively involves the calculation of a notional route by the PND between N and T, and optionally any of the subsequent intersection points O, P, Q, R, and S and either N or T, and the comparison of these routes with consecutive and optionally adjoining segments of the logfile between turns to establish a most condensed log format. For example, the algorithm effectively determines the minimum amount of information, in terms of a notional primary route and optionally one or more secondary routes to replace the route segments represented in the log file. Specifically, the most abridged representation of the abovementioned logfile may be a notional route between N and P, and a further notional route between P and S, and a further notional route between S and T. This is of course unlikely, because in a free driving mode, the user has most probably dispensed with the navigation function of the device because he already knows the most direct route between his starting point and his desired location, and a more likely scenario is that the various segments represented by turns at intersections in the logfile may be replaced by a single notional calculated route between N and T, such being identical to the route actually taken by the user.

Accordingly, in the compression process, the device iterates thorough the turn points and tries to merge them.

Using the above example, the process logic is as follows: the device will try to plan a path from N to P and check if O is included in the path. If so a new route will be planned from N to Q and see if O and P are in the path of the planned route, and so forth. If not, Entries from N to P will be replaced by one entry and compression will continue from P. This process will continue until all the turn points are included in the log. In this compression, other algorithms such as divide and conquer can also be used.

In a planned route mode, the logging of information is much reduced, as hereinafter described. In this case the device calculates a routes which is followed, at least partially, by the user. The following are the minimal set of events to enable logging in planned route mode:

When an activity (business or personal) is specified,
When a new route is planned,
When the planned route is altered or deviated from,
When the destination is reached.

For example, the user specifies the purpose of travel, business or personal, and then enters the target location. The device plans a new route from the current location to the target location. If A and D denote the current and the target locations, respectively. Along the route, around location B, the user changes course and does not follow the suggested route for some reason. The device will make new route plan from the current location, and either the deviation, or the calculation of a new route can be events which trigger information logging. Later around location C in the new route, the user decides again to alter course away from the suggested route. After a while device makes a new plan for the target location. Again, information is logged, either on detection of deviation from the calculated route, or on calculation of the new route. Finally the target destination D is reached. The user sets the activity to personal use.

Using the events defined above, we will have the following trip log entry, at the end of this trip:

Activity set to Business use: Total: 5000 km [Date/Time]
Route planned from A to D (Total: 5000 km) [date/time or increment a]
Route altered around B (A-B:5 km, Total:5005 km) [date/time or increment b]
Recalculate from B to D (Total: 5005 km) [date/time or increment c]
Route altered around C (B-C:10 km, Total:5015 km) [date/time or increment d]
Recalculate from C to D (Total: 5015 km) [date/time or increment e]
Destination D is reached (C-D:25 km, Total:5040 km) [date/time or increment f]
Activity set to Personal use: Total: 400 km [date/time or increment g]

It is to be noted from the above that it is not necessary to record the actual date and time, and only the recording of a first date and time, and a subsequent changing increment might be logged.

The events used above for logging are all physical spatial events. However, the invention can be enhanced using temporal and device events as well. For instance, it may be possible to automatically enable a "business" mode during weekdays when leaving from home in the morning and disabling again when home is reached in the afternoon. Another interesting event is when the device location does not change for a long time. Such fixed time and location based loggings are still valid events though possibly creating larger logfile sizes.

What is claimed is:

1. A method of providing a logging function in a personal navigation device, the method comprising the steps of:
   storing information relating to current position and time-specific information relating to said current position in a non-volatile memory of the device to create a log file, said step of storing occurring only when one of a specified set of events occurs, said set of events being at least one of:
      user-specification of an spatial, temporal or device event, changing an activity between business and personal, reaching a destination, powering the device on and/or off, being stationary at a location for more than a predetermined time period, arriving at or departing from any favorite or recent location stored in the memory of the device, and arriving at or departing from any home location stored in the memory of the device;
   receiving a navigation mode or a free-driving mode of operation selection on the navigation device, wherein the selection causes an automatic storing of information related to a selectable additional set of events specific to either the navigation mode or the free-driving mode that are different for each of the mode of operation; and
   compressing a collection of events in said log file that were collected in said free-driving mode, said compressing comprising:
      determining, based on information in said log file, two or more locations that were traveled to during said free-driving mode;
      calculating a notional route between said two or more locations;
      iterating through event information included in said log file to determine whether any of said two or more locations are present on said notional route; and
      when said two or more locations are represented on said notional route, replacing, in said log file, some or all of said collection of events by said notional route.

2. The method according to claim 1, wherein said set of events or said additional set of events can be defined as a state change of a setting within the navigation device.

3. The method according to claim 1, wherein said additional set of events particular to the navigation mode include at least one of a calculation of a new route, recalculation of a new route, deviation from a previously calculated route, and every turn or route change made at any route intersection; and
   said set of events particular to the free driving mode being a deviation of the navigation device from the current direction and road along which the device is traveling.

4. The method according to claim 1, further comprising the steps of:
   determining whether a logging function is enabled on said navigation device, and performing the logging function only if such a function is enabled.

5. The method according to claim 1, wherein, in the navigation mode of operation of said device, said set of events which triggers a logging of information, includes powering on or off of the device.

6. The method according to claim 1, wherein, in the freedriving mode, said event of a deviation of the navigation device from the current direction and road along which the device is traveling triggers a logging of information when said navigation device recognizes a change in road identification, as represented in map data by reference to which current device location is identified to said user.

7. The method according to claim 1, further comprising the step of determining whether said device is operating in a business or personal capacity, and logging information in a manner categorized according to the business or personal use of the navigation device.

8. A navigation device for providing a logging function, the navigation device comprising:
   a memory; and
   a processor, the processor being arranged to store information relating to current position and time-specific information relating to said current position in a non-volatile memory of the device to create a log file, said step of storing occurring only when one of a specified set of events occurs, said set of events being at least one of:
      user-specification of an spatial, temporal or device event, changing an activity between business and personal, reaching a destination, powering the device on and/or of being stationary at a location for more than a predetermined time period, arriving at or departing from any favorite or recent location stored in the memory of the device, and arriving at or departing from any home location stored in the memory of the device;

receive a navigation mode or a free-driving mode of operation selection on the navigation device, wherein the selection causes a selectable automatic storing of information related to an additional set of events specific to either the navigation mode or the free-driving mode that are different for each of the mode of operation; and compressing a collection of events in said log file that were collected in said free-driving mode, said compressing comprising:

determining, based on information in said log file, two or more locations that were traveled to during said free-driving mode;

calculating a notional route between said two or more locations;

iterating through event information included in said log file to determine whether any of said two or more locations are present on said notional route; and when said two or more locations are represented on said notional route, replacing, in said log file, some or all of said collection of events by said notional route.

9. The navigation device according to claim 8, wherein said set of events or said additional set of events can be defined as a state change of a setting within the navigation device.

10. The navigation device according to claim 8, wherein said additional set of events particular to the navigation mode include at least one of a calculation of a new route, recalculation of a new route, deviation from a previously calculated route, and every turn or route change made at any route intersection; and said set of events particular to the free driving mode being a deviation of the navigation device from the current direction and road along which the device is traveling.

11. The navigation device according to claim 8, wherein said processor is further arranged to:

determine whether a logging function is enabled on said personal navigation device; and perform the logging function only if such a function is enabled.

12. The navigation device according to claim 8, wherein, in the navigation mode of operation of said navigation device, said set of events which triggers a logging of information, includes powering on or off of the device.

13. The navigation device according to claim 8, wherein, in a free-driving mode, said event of a deviation of the navigation device from the current direction and road along which the device is traveling triggers a logging of information when said navigation device recognizes a change in road identification, as represented in map data by reference to which current device location is identified to said user.

14. The navigation device according to claim 8, wherein said processor is further arranged to:

determine whether said device is operating in a business or personal capacity; and log information in a manner categorized according to the business or personal use of the navigation device.

15. A non-transitory computer-readable medium which stores a set of instructions which when executed performs a method for method of providing a logging function in a personal navigation device, the method comprising the steps of:

storing information relating to current position and time-specific information relating to said current position in a non-volatile memory of the device to create a log file, said step of storing occurring only when one of a specified set of events occurs, said set of events being at least one of:

user-specification of an spatial, temporal or device event, changing an activity between business and personal, reaching a destination, powering the device on and/or off, being stationary at a location for more than a predetermined time period, arriving at or departing from any favorite or recent location stored in the memory of the device, and arriving at or departing from any home location stored in the memory of the device;

receiving a navigation mode or a free-driving mode of operation selection on the navigation device, wherein the selection causes an automatic storing of information related to a selectable additional set of events specific to either the navigation mode or the free-driving mode that are different for each of the mode of operation; and compressing a collection of events in said log file that were collected in said free-driving mode, said compressing comprising:

determining, based on information in said log file, two or more locations that were traveled to during said free-driving mode;

calculating a notional route between said two or more locations;

iterating through event information included in said log file to determine whether any of said two or more locations are present on said notional route; and when said two or more locations are represented on said notional route, replacing, in said log file, some or all of said collection of events by said notional route.

16. The computer readable medium according to claim 15, wherein said additional set of events particular to the navigation mode include at least one of a calculation of a new route, recalculation of a new route, deviation from a previously calculated route, and every turn or route change made at any route intersection; and said set of events particular to the free driving mode being a deviation of the navigation device from the current direction and road along which the device is traveling.

* * * * *